Aug. 3, 1943.   N. F. ADAMSON   2,325,647
AIR COOLED TRANSMISSION
Filed Sept. 15, 1942   9 Sheets-Sheet 1

Inventor:
Nicholas F. Adamson,
By John W. Darley
Attorney

Aug. 3, 1943.   N. F. ADAMSON   2,325,647
AIR COOLED TRANSMISSION
Filed Sept. 15, 1942   9 Sheets-Sheet 5

Inventor:
Nicholas F. Adamson
By John M. Darley
Attorney

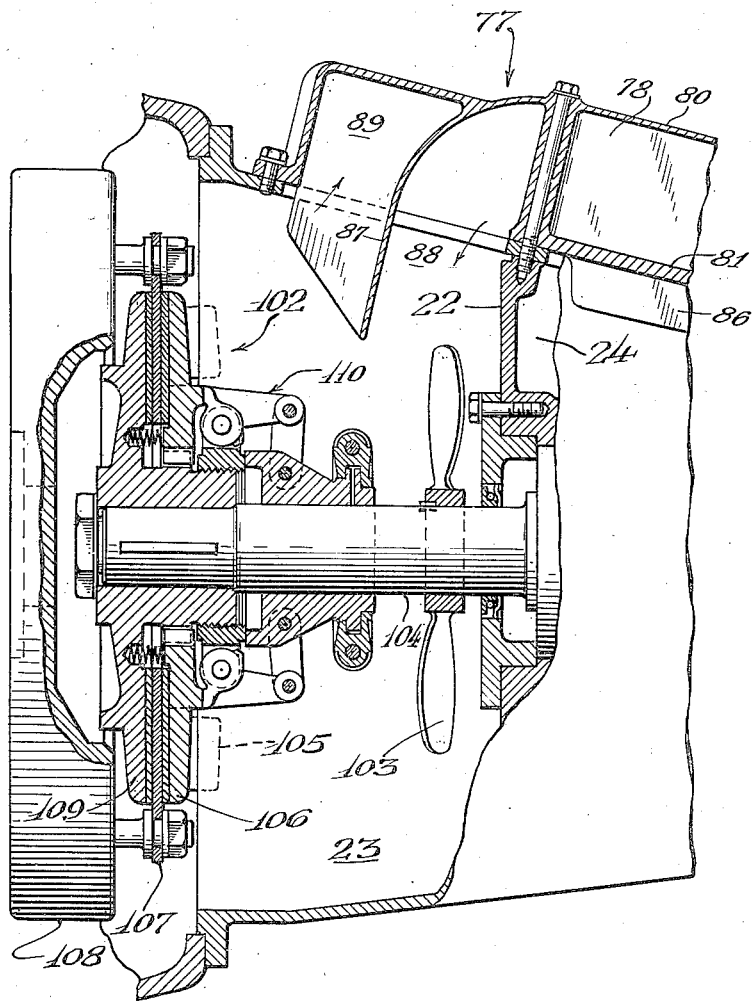

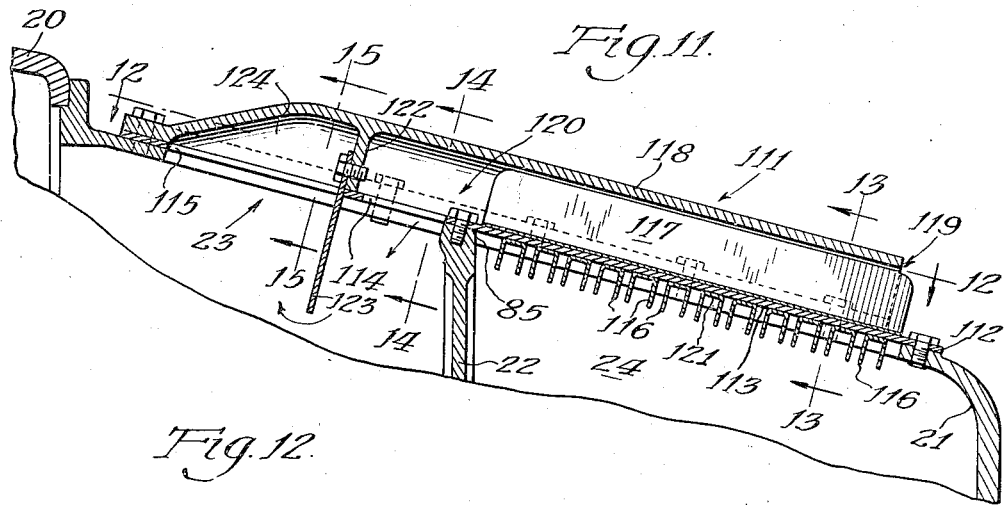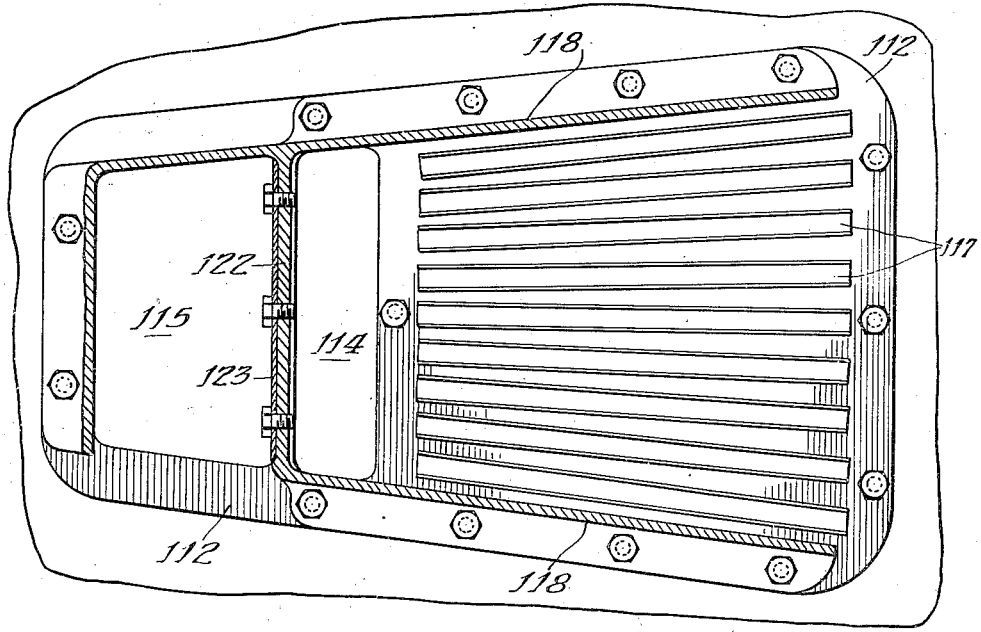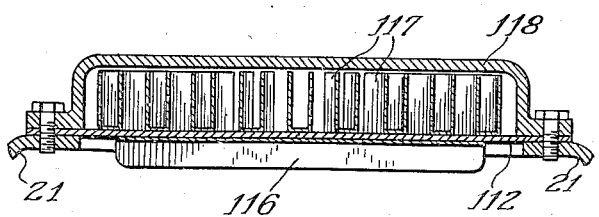

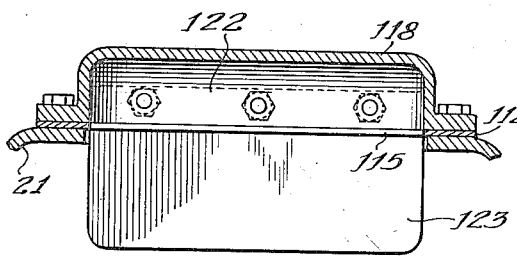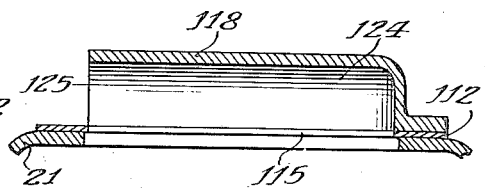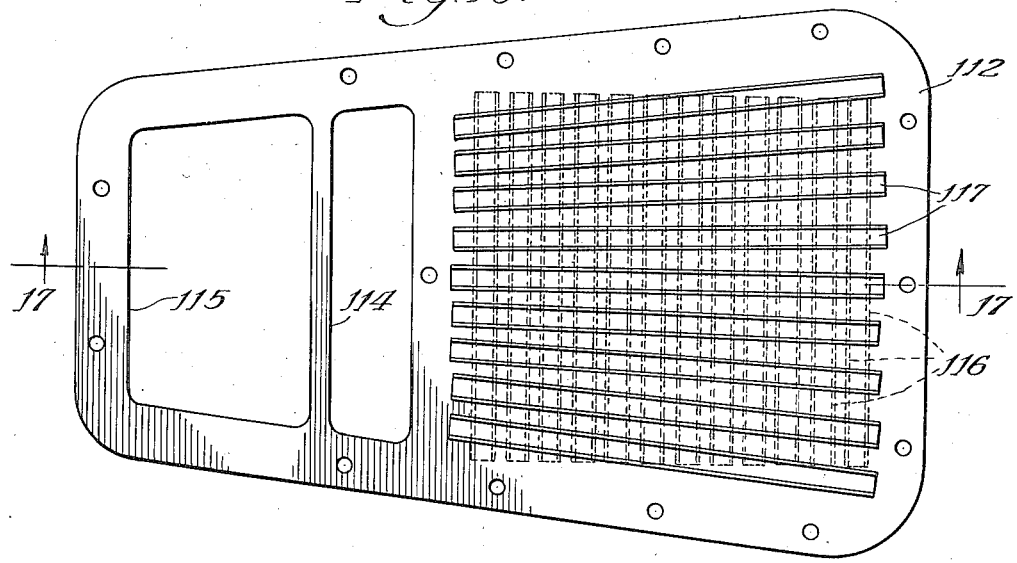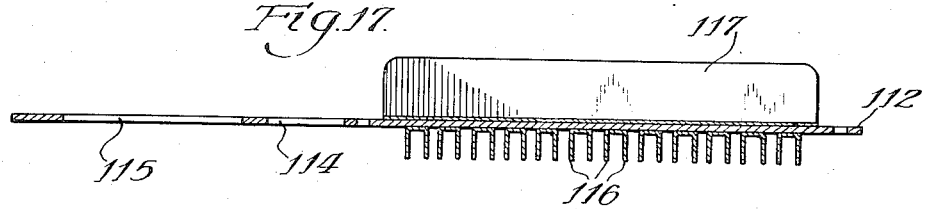

Patented Aug. 3, 1943

2,325,647

UNITED STATES PATENT OFFICE 2,325,647

AIR-COOLED TRANSMISSION

Nicholas F. Adamson, Racine, Wis., assignor to Twin Disc Clutch Company, Racine, Wis., a corporation of Wisconsin Application September 15, 1942, Serial No. 458,380

27 Claims. (Cl. 74—606)

My invention relates to the air cooling of transmissions, and more particularly to those of the marine type which incorporate a reversing gear, with or without speed reduction, between the engine and propeller shaft commensurate with efficient propeller action.

These transmission are customarily enclosed within a housing and the gears and bearings are usually splash lubricated. During sustained runs, the lubricating oil becomes hot and it has long been recognized that, for successful operation, the temperature within the housing should be maintained well below 300° F. Above this temperature, the oil seals which normally prevent leakage of oil along the shafts become less efficient, as does also the lubrication of the shaft bearings, usually of the ball type, due to the reduced viscosity of the oil. Such bearings are also metallurgically affected by high temperatures existing over a long period.

Heretofore, this cooling problem has been countered by circulating water through cored water jackets in the housing. Due to the jackets, the manufacture of such housings occasionally present a troublesome production problem, and their use increases the cost of installation since piping and other connections must be employed to supply and evacuate water to and from the jackets.

It is therefore the principal object of my invention to provide a means of cooling a transmission by passing a stream of air in indirect heat exchange relation to the lubricating oil of the transmission gearing.

A further object is to devise a cooling arrangement of the character indicated in which the air stream is set up by a fan member operating in a chamber adjacent the gear housing.

A further object is to utilize the rotating operating members of the clutch customarily associated with the transmission as fan elements for establishing a flow of air across a portion of the housing whose opposite surface is bathed by the oil within the housing.

A further object is to set up the indicated air stream by fan blades attached to a rotating member of the clutch, such as a clamping plate.

These and further objects of my invention will be set forth in the following specification, reference being had to the accompanying drawings, and the novel means by which said objects are effectuated will be definitely pointed out in the claims.

In the drawings:

Fig. 10 is a fragmentary, sectional elevation of a further modification provided with the cooling unit shown in Fig. 1, but employing a different type of clutch and a separate fan for inducing a flow of air, or alternatively, fan blades, shown dotted, attached to the clamping member of the clutch.

Fig. 11 is a sectional elevation of a fabricated cooling unit which may be used in place of the unit shown in Fig. 1.

Figs. 12, 13, 14 and 15 are sections along the lines 12—12, 13—13, 14—14 and 15—15, respectively, in Fig. 11.

Fig. 16 is a plan view of the plate member of the unit which is equipped with the cooling fins.

Fig. 17 is a section along the line 17—17 in Fig. 16.

Figure 1:
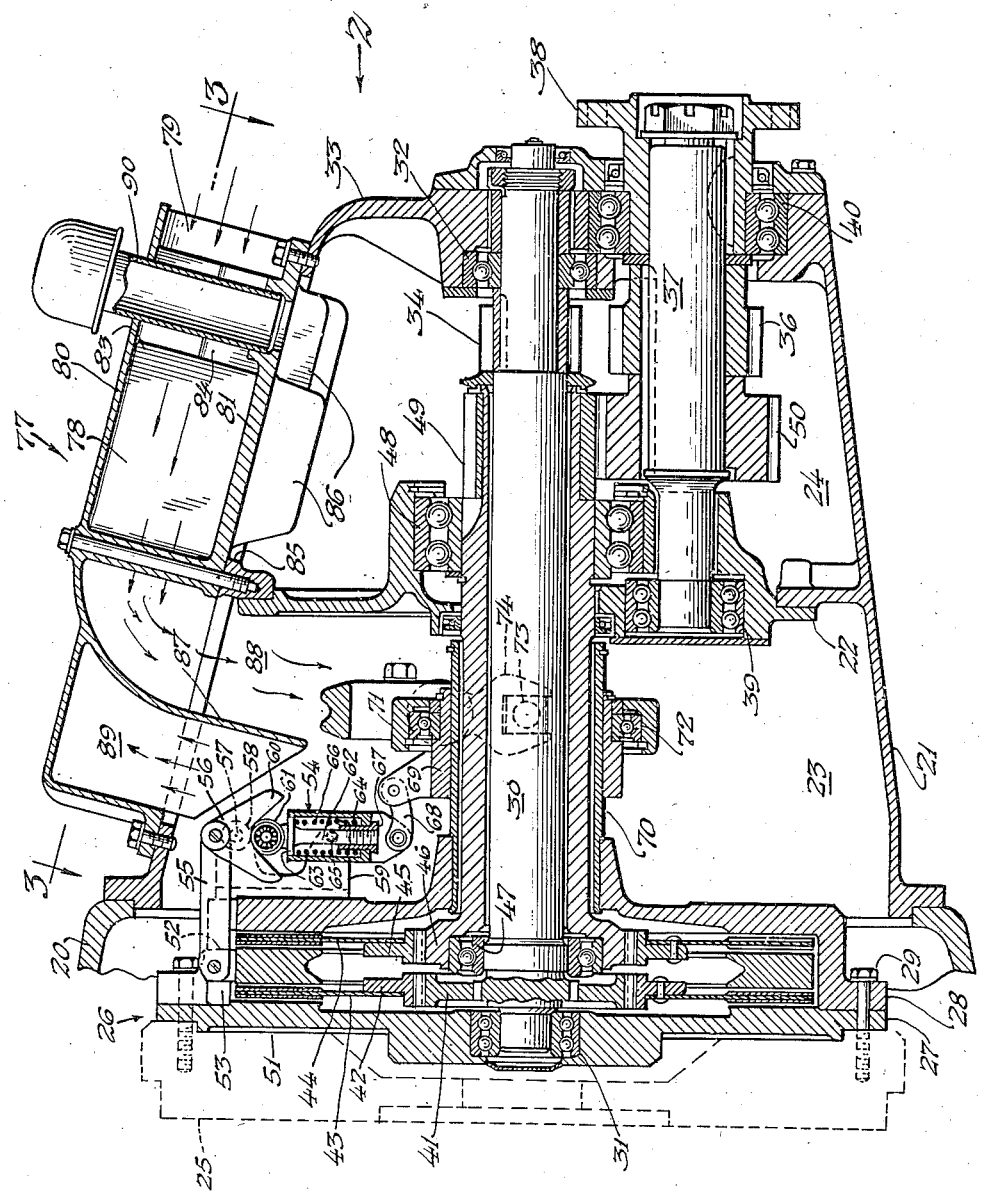
Fig. 1 is a sectional elevation of a typical marine reverse and reduction gear equipped with my improved air cooling unit.

Referring to Fig. 1, the numeral 20 designates the crank case of an engine (not shown) which is bolted to one end of a transmission housing 21 that is interiorly divided by a wall 22 into clutch and gear compartments 23 and 24, respectively. An engine flywheel 25 is attached at one side to the engine crank shaft (not shown) while to the opposite side is connected a clutch casing 26 composed of the separable, complementary parts 27 and 28 by means of bolts 29.

Figure 2:
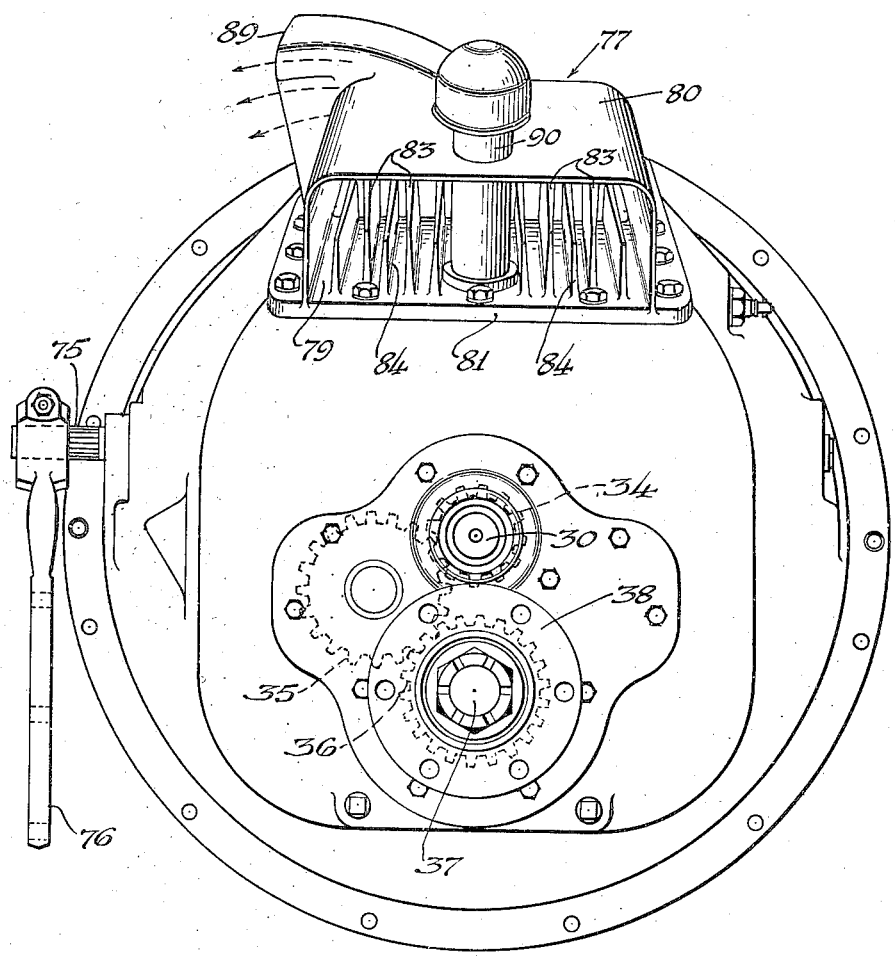
Fig. 2 is an end view of the gear, looking in the direction of the arrow 2 in Fig. 1, showing a part of the finned construction of the cooling unit.
Figure 3:
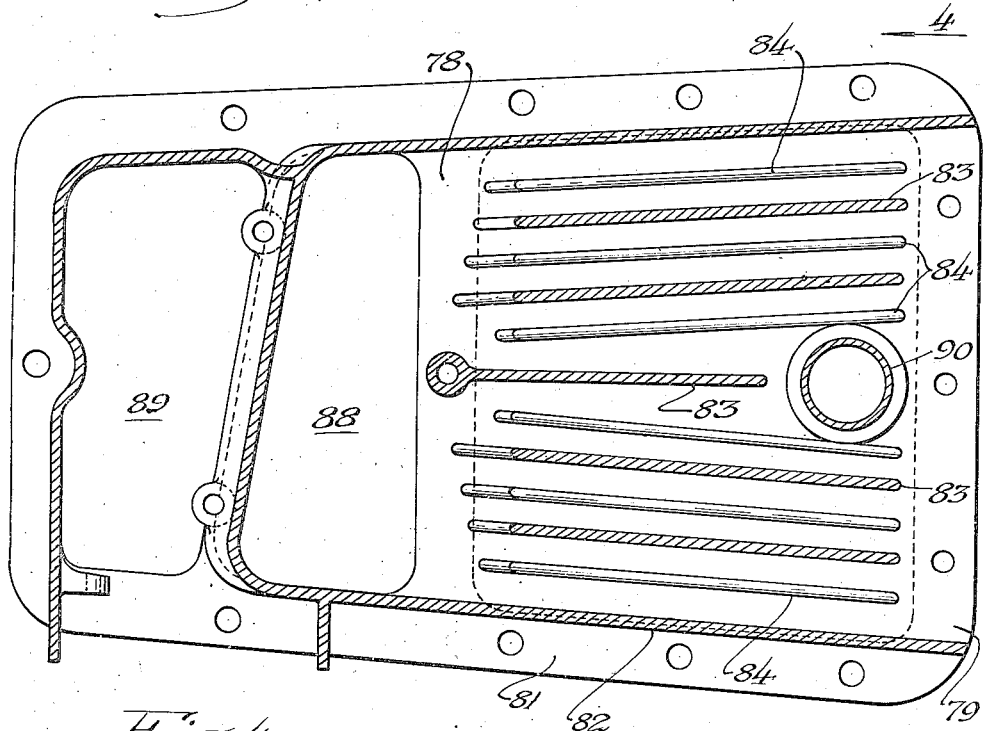
Fig. 3 is a plan section of the cooling unit taken along the line 3—3 in Fig. 1.
Figure 4:
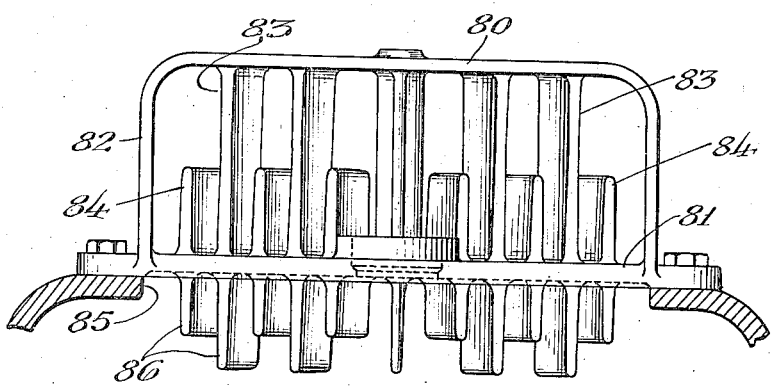
Fig. 4 is an end view of the unit, looking in the direction of the arrow 4 in Fig. 3, showing the heat conducting fins which are bathed by the hot oil in the gear compartment and the air stream, respectively.
Figure 5:
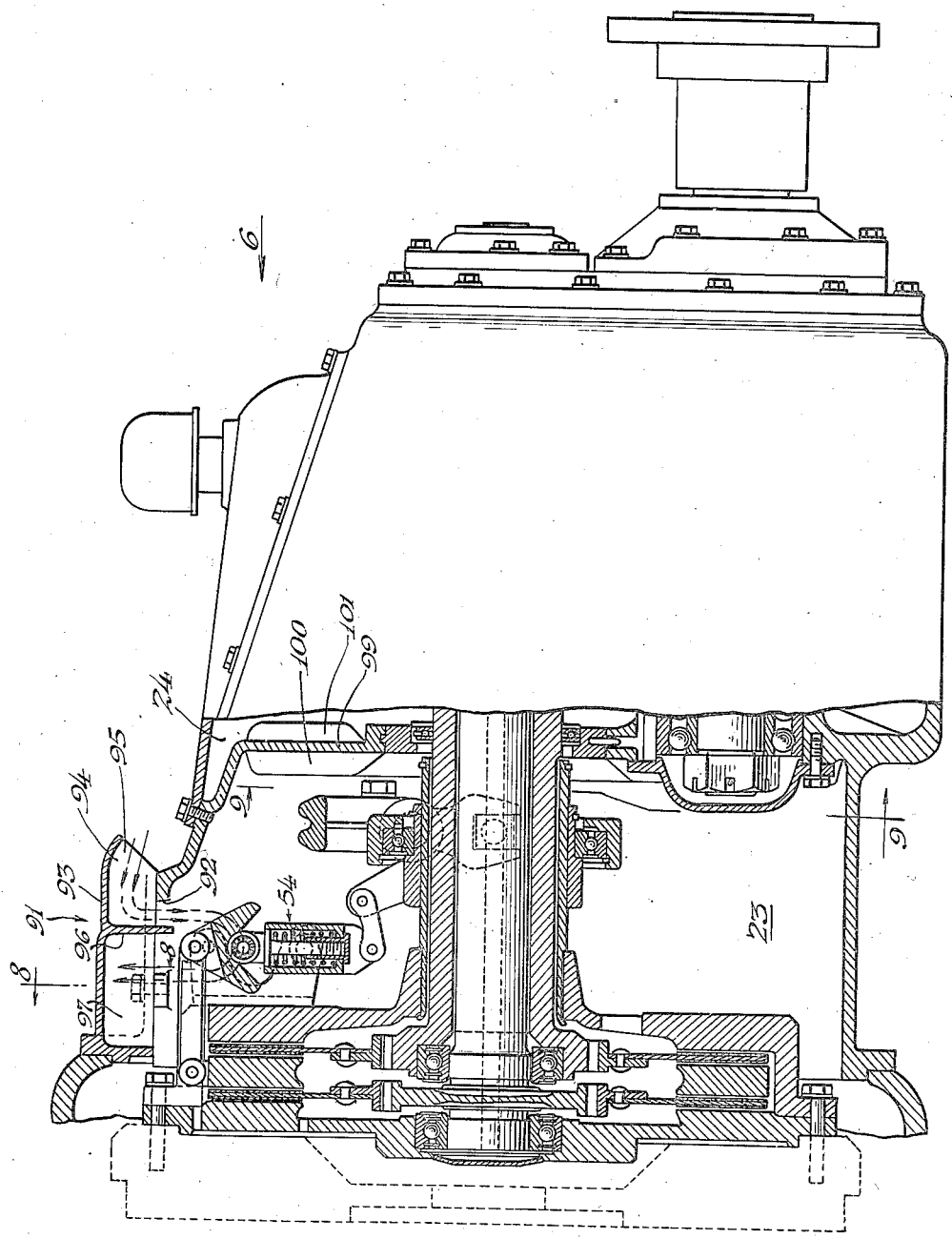
Fig. 5 is a side elevation, partly in section, of a gear similar to that shown in Fig. 1, but equipped with a modified form of air cooling unit.
Figure 6:
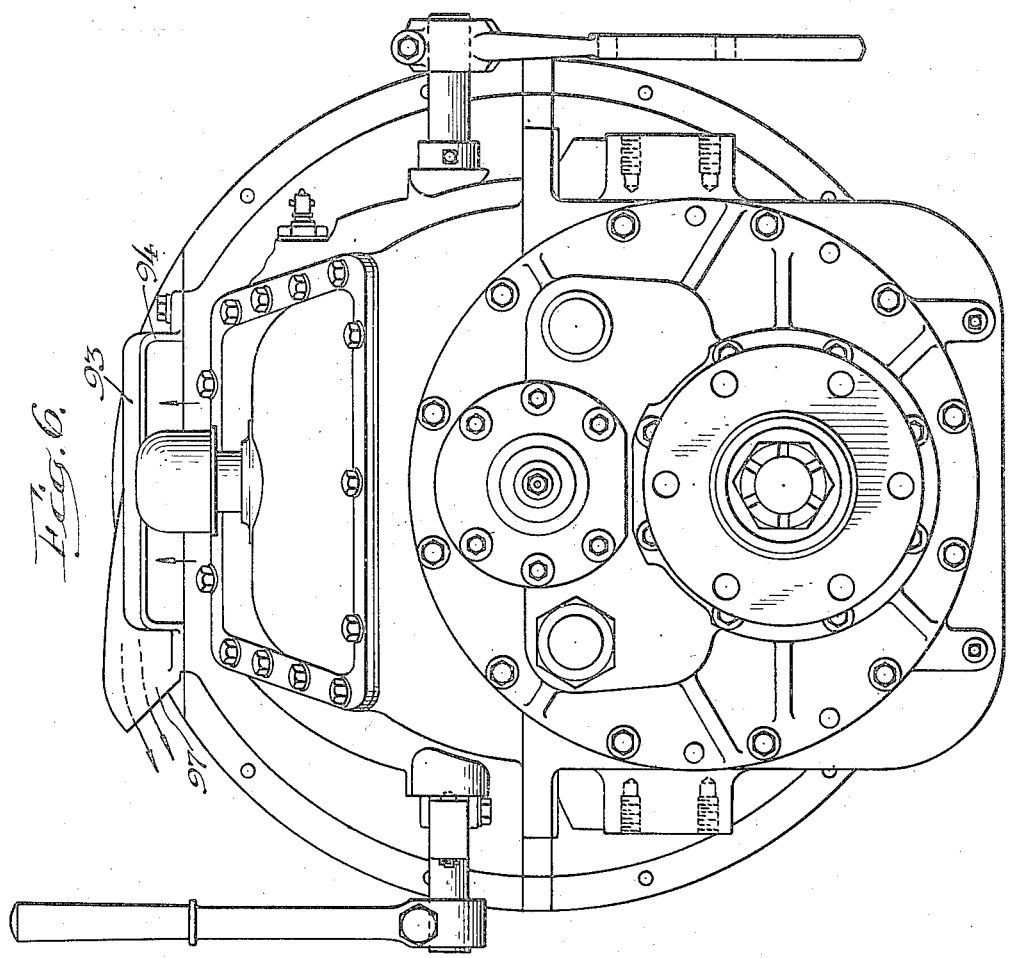
Fig. 6 is an end view of the transmission shown in Fig. 5, looking in the direction of the arrow 6.
Figure 7:
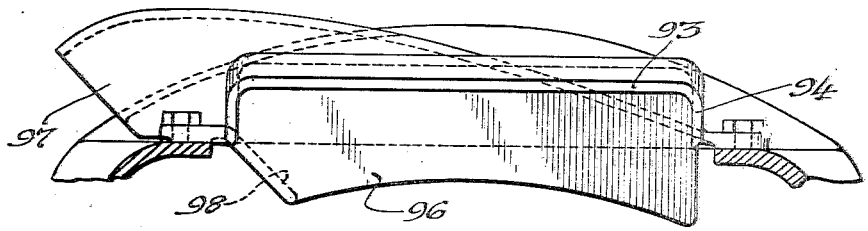
Fig. 7 is an enlarged view of the air cooling unit in and as viewed in Fig. 6, a fragmentary portion of the gear housing being shown in section.
Figure 8:
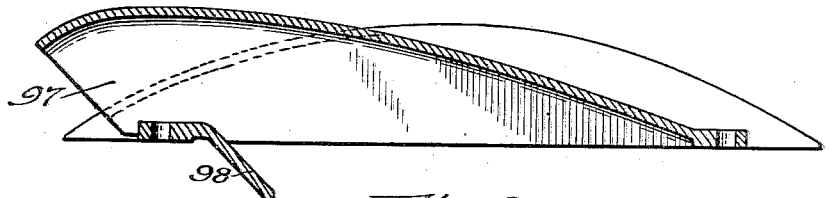
Fig. 8 is a mid-sectional elevation of the unit as viewed in Fig. 7, or as taken along the line 8—8 in Fig. 5.
Figure 9:
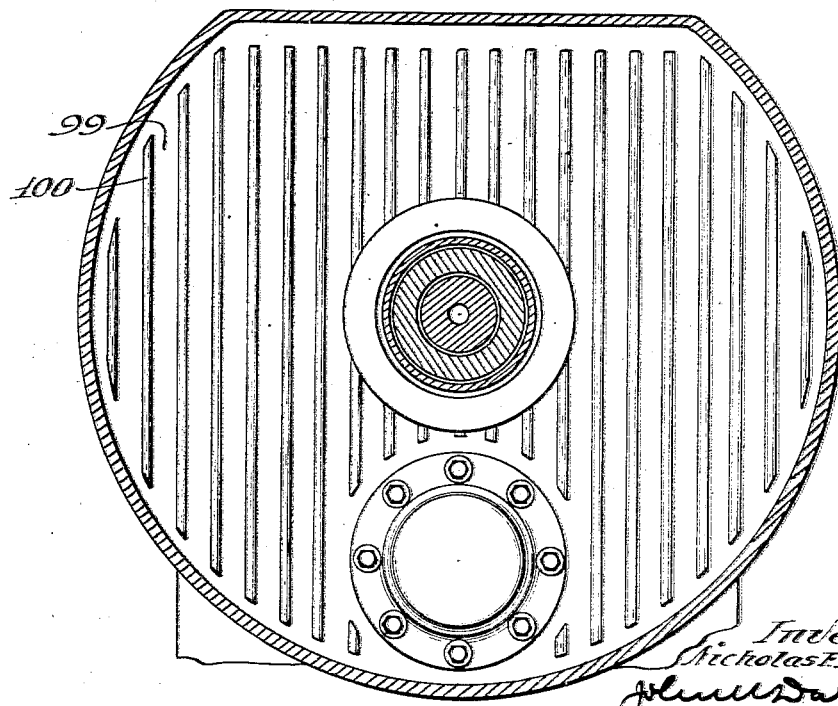
Fig. 9 is a section along the line 9—9 in Fig. 5 showing the heat conducting fins on the wall between the clutch and gear compartments.

One end of a reverse drive shaft 30 is journaled in a bearing 31 carried by the casing part 27, while the opposite end is journaled in a bearing 32 mounted in the end wall 33 of the housing 21. A pinion 34 is keyed to the shaft 30 and through an idler gear 35, rotatably supported in the wall 33 (see Fig. 2), is drivably connected to a gear 36 keyed to a driven shaft 37 that extends through the wall 33 and may be flanged as at 38 for attachment to a propeller shaft (not shown). The shaft 37 is journaled in bearings 39 and 40 mounted, respectively, in the walls 22 and 33.

Adjacent the casing part 27, the shaft 30 is provided with an externally toothed flange 41 which is in constant mesh with an internally toothed ring 42 that carries a friction disc 43. A similar disc 44, positioned adjacent the casing part 28, is secured to an internally toothed ring 45 which is in constant mesh with one end of an externally toothed, direct drive sleeve 46. The indicated sleeve end is supported out of contact with the shaft 30 by a bearing 47 carried by the shaft, while adjacent the opposite end, the sleeve is journaled in a bearing 48 mounted in the wall 22. Accordingly, the sleeve 46 may rotate freely and independently of the shaft 30. Within the compartment 24, a pinion 49 is keyed to the sleeve 46 and meshes with a gear 50 secured to the shaft 37.

From the foregoing, it will be understood that all of the transmission gearing and the shaft bearings therefor are included within the compartment 24 and these parts are self-oiled, i. e., all lubricant is contained within the compartment as distinguished from a forced circulation of the oil from an external reservoir. Preferably, a splash method of lubrication is employed. I take advantage of this arrangement in providing for an effective cooling of the transmission as hereinafter described.

The sleeve 46 and shaft 30 transmit power to the respective gearing above described and their connection to the flywheel 25 are, respectively, provided by a direct drive clutch comprising the casing part 29 and friction disc 44, and a reverse drive clutch comprising the casing part 27 and friction disc 43. A common clamping plate 51 for these clutches is located between the discs 43 and 44 and driving engagement of the plate with the clutch casing is obtained by means of a plurality of circumferentially spaced lugs 52, only one of which is illustrated in Fig. 1, which extend outwardly from the periphery of the plate through similarly spaced slots 53 cut in the periphery of the casing part 28.

As shown in Fig. 1, the clutches are in neutral position and the distance between the opposed faces of the casing parts 27 and 28 is such that when the plate 51 is in the intermediate position shown, the discs 43 and 44 may freely shift axially to positions free of driving contact with the faces of the plate and the casing parts 27 and 28.

The clutches are selectively engaged by a plurality of operators designated generally by the numeral 54, only one being shown in Fig. 1. These operators are equispaced around the axis of the clutches and as many may be employed as the conditions of operation require. In any case, it will be noted from Fig. 1 that the operators are offset from and rotate with the clutch casing and possess sufficient exposed surface to set up a substantial fan action on the air in the compartment 23. As hereinafter described, this feature is utilized to air cool the transmission.

Each operator comprises a link 55, one end of which is pivotally secured to a lug 52 while the opposite end is offset from the clutch casing and is pivotally connected to one arm of a lever 56 that is intermediately pivoted at 57 on an outer arm 58 of a bracket 59 that is fastened to the casing part 28. Radially inward of the pivot pin 57, the lever 56 is provided with a pair of divergent arms 60 which are symmetrically disposed in perpendicular relation to each other on opposite sides of a radius through the pin 57 when the plate 51 is in neutral position.

A peripherally grooved roller 61, disposed between and in guiding and bearing relation to the arms 60, is rotatable on the outer end of a stem 62 which includes a flange 63 slidable within a spring cup 64. This cup is pivoted on a pin 65 mounted in an inner arm of the bracket 59. A helical spring 66 encircles the stem 62 between the flange 63 and the bottom of the cup 64 and acts to maintain the roller 61 in contact with both arms 60 when the operator occupies the position shown in Fig. 1, or with either arm depending upon which clutch is engaged. The inner end of the stem 62, radially considered, is threaded into a shouldered sleeve 67 that is slidable through the inner end of the cup 64, the sleeve shoulder abutting the cup and limiting outward, radial movement of the stem.

The inner end of the cup is connected by a link 68 to a sleeve 69 that is slidable along a tubular extension 70 carried by the casing part 28. A collar 71 encircles and is connected by a ball bearing 72 with the sleeve 69 and is provided with trunnion pins 73. These pins are engaged by arms 74 provided on an operating lever that is pivoted on a shaft 75 (see Fig. 2) which is externally rocked by a lever 76.

The foregoing transmission in and of itself forms no part of the present invention, being substantially identical with the transmission described and claimed in United States Letters Patent No. 2,127,713, dated August 23, 1938. During operation, when the cup 64 is rocked counterclockwise, the plate 51 is shifted to the right to engage the direct drive clutch and transmit power through the pinion 49 and gear 50 to the shaft 37, and when rocked clockwise, the reversing clutch is engaged to thereby transmit power through the pinion 34, idler 35 and gear 36 to the shaft 37.

For the purpose of cooling the transmission, I employ a unit 77 which serves as a cover plate for the compartments 23 and 24. The unit comprises a duct 78 having an air inlet 79 which is open to the atmosphere, the duct being defined by top and bottom walls 80 and 81, respectively, and side walls 82 (see Figs. 1 to 4, inclusive). Spaced, heat conducting walls 83 extend between the walls 80 and 81 in alternating relation to heat conducting fins 84 which project from the wall 81. The walls 83 provide heat conducting elements extending through the mass of air flowing through the duct and also divide the air flow into a plurality of separate streams. However, the walls 83 may be shortened to a height equal to the fins 84, or different therefrom, without departing from the spirit of the invention, the essential requirement being that there shall be an efficient heat exchange between the air and the walls and fins in the duct.

The bottom wall 81, also formed of heat conducting material, overlies an opening 85 in the top of the compartment 24, although it will be understood that the location of this opening is not important, and depending from the bottom wall within the compartment is a plurality of spaced, heat conducting fins 86. A curved extension of the wall 80 is continued within the compartment 23 to form a baffle 87 which defines with the wall 22 an inlet 88 to the clutch compartment. The air in the latter compartment is discharged through an outlet 89 included within the unit 77 which also embodies provision for receiving a breather tube 90 as a pressure relief for the compartment 24.

During operation of the transmission and assuming splash lubrication in the compartment 24, it will be obvious that the fins 86 will be continuously bathed with hot oil and that a large portion of this heat will be conducted through the fins 86, bottom wall 81, fins 84 and walls 82 and 83. The fan action of the clutch operators 54 induces a flow of air through the duct 78 in heat exchange relation to the elements within and defining the duct. The hot air is guided by the baffle 87 well into the low pressure zone of the fan action to thereby insure a vigorous air flow and is then expelled through the outlet 89 to the atmosphere. In this operation, therefore, the clutch compartment 23 substantially constitutes a continuation of the duct 78.

A very substantial cooling effect has been obtained with the above arrangement, for it has been possible to reduce the temperature within the gear compartment 24 as much as 100° F. The cooling unit may be composed of any material having a good heat conductance, such as aluminum.

In Figs. 5 to 9, inclusive, is illustrated a modified cooling unit 91 for use with the transmission shown in Fig. 1. The unit 91 overlies an opening 92 provided in a wall of the clutch compartment 23 and comprises a top wall 93 and side walls 94 which enclose an air passage 95 communicating at one end with the atmosphere and at the opposite end with the compartment 23. Air moving through the passage 95 is deflected by a baffle 96 into the compartment and thence discharged through an outlet 97 included within the unit 91. An inclined vane 98 may be used to direct the discharging air to the outlet. As before, the cooling air stream is induced by the rotation of the clutch operators 54.

In this case, the cooling is accomplished by the air flowing through the compartment 23 across the wall 99 between the clutch and gear compartments 23 and 24, respectively, this wall corresponding to the wall 22 in Fig. 1 and being composed of heat conducting material, such as aluminum. The heat exchange effect may be increased by providing ribs 100 on the clutch side of the wall 99 and similar ribs 101 may be formed on the gear side.

A still further modification is illustrated in Fig. 10 wherein the transmission is identical with that illustrated in Fig. 1, except that only a single clutch 102 is employed and that, accordingly, from the gearing in the compartment 24 is eliminated the reverse drive gears 34, 35 and 36. The clutch 102 is intended to generally represent those clutches, single or duplex, in which the operating mechanism, either by reason of location or insufficient exposed surface, is incapable of setting up a fan action adequate for inducing an effective flow of air through the cooling unit 77.

Under these conditions, a separate fan 103 may be mounted on the clutch shaft 104 if space permits, or alternatively fan blades 105 may be secured to a rotating member of the clutch, such as the clamping plate 106. The air inducing and cooling action is identical with those heretofore described.

The clutch shown in Fig. 10 is similar to that disclosed in United States Letters Patent No. 2,167,705 and comprises a driving plate 107 which is drivably connected to a flywheel 108, for example, and gripped between an abutment 109 secured to the shaft 104 and the plate 106 by operating mechanism indicated by the numeral 110.

Another type of clutch which might be employed is that disclosed in United States Letters Patent No. 2,077,709. The operating mechanism in this clutch is substantially housed within the principal members of the clutch so that fan action is not possible. Either of the alternatives shown in Fig. 10 may be employed with a clutch of this type.

In Figs. 11 to 17, inclusive, there is illustrated a fabricated cooling unit 111 which is positioned relative to the transmission in the same manner as the unit 77. It comprises a flat, cover plate 112 which overlies the compartments 23 and 24, that portion 113 of the plate which registers with the compartment 24 being impervious and composed of heat conducting material, while the remaining portion of the plate is provided with separate openings 114 and 115 which register with the compartment 23.

A plurality of heat conducting fins 116 depend from the under side of the plate portion 113 and extend generally transverse to the shafts of the transmission. In this position, the fins 116 are efficiently bathed by oil thrown by the gears in the compartment 24. A similar set of fins 117 extend from the opposite side of the portion 113 and is included within a housing 118 which serves as a cover for the compartment 23 and which is bolted to, and clamps the plate 112 against the transmission housing 21. The right end of the housing 118, as viewed in Fig. 11, is open as at 119 and through this opening air is induced to flow through the duct 120 within the housing and along the fins 117 by the clutch operators or other fan elements in the compartment 23 as hereinbefore described.

In order to secure the most efficient heat exchange with the induced air, the fins 117 are preferably disposed lengthwise of the flow direction of the air and extend for substantially the full height of the duct 120 with their outer ends projecting beyond the opening 119, while the fins 116 are arranged so that oil thrown by the rotating gears flows along the fins. In the particular disposition illustrated, the sets of fins are normal to each other as shown in Figs. 16 and 17. Each set of fins may be conveniently made by securing a plurality of channels 121 to the opposite sides of the portion 113.

Air moving through the duct 120 is deflected by a transverse wall 122 within the housing 118 and by a baffle 123 forming a continuation of the wall into the compartment 23 from whence it is expelled into the housing chamber 124 and then laterally through a discharge outlet 125 (see Fig. 15).

I claim:

1. An air cooled transmission comprising oil bathed gearing, a clutch connected to the gearing, the gearing and clutch being enclosed in separate chambers having a common heat conducting wall and the clutch chamber having an air inlet and outlet, and fan elements carried by the clutch for establishing a flow of air across the wall.

2. An air cooled transmission comprising oil bathed gearing, a clutch connected to the gearing, the gearing and clutch being enclosed in a pair of chambers, respectively, duct means having an air inlet and an outlet communicating with the clutch chamber and operably related to a heat conducting portion of the gearing chamber whose opposite surface is contacted by the oil, and fan elements carried by the clutch for inducing a flow of air through the duct means into the clutch chamber, the clutch chamber including an exhaust opening for discharging the heated air.

3. An air cooled transmission comprising oil bathed gearing, a clutch connected to the gearing, the gearing and clutch being enclosed in a pair of chambers, respectively, a wall of the gearing chamber having heat conducting fins extending inwardly thereof for contact with the oil, duct means having an air inlet, an outlet communicating with the clutch chamber, and fins in heat conducting relation to the wall fins and exposed to air flowing through the duct means, and fan elements carried by the clutch for inducing a flow of air through the duct means into the clutch chamber, the clutch chamber including an exhaust opening for discharging the heated air.

4. An air cooled transmission comprising oil bathed gearing, a clutch connected to the gearing, the gearing and clutch being enclosed in a pair of chambers, respectively, a common cover plate for the chambers having heat conducting fins extending into the gearing chamber for contact with the oil and an external passage having an air inlet, an outlet communicating with the clutch chamber, and fins in heat conducting relation to the first named fins and exposed to air flowing through the passage, and fan elements carried by the clutch for inducing a flow of air through the passage into the clutch chamber, the clutch chamber including an exhaust opening for discharging the heated air.

5. An air cooled transmission comprising oil bathed gearing, a clutch connected to the gearing, the gearing and clutch being enclosed in separate chambers having a common heat conducting wall and the clutch chamber having an air inlet and outlet, fan elements carried by the clutch for establishing a flow of air across the wall, and a baffle adjacent the inlet for directing the incoming air towards the low pressure zone of the clutch chamber.

6. An air cooled transmission comprising oil bathed gearing, a clutch connected to the gearing, the gearing and clutch being enclosed in a pair of chambers, respectively, duct means having an air inlet and an outlet communicating with the clutch chamber and operably related to a heat conducting portion of the gearing chamber whose opposite surface is contacted by the oil, fan elements carried by the clutch for inducing a flow of air through the duct means into the clutch chamber, the clutch chamber including an exhaust opening for discharging the heated air, and a baffle adjacent the outlet for directing the incoming air towards the low pressure zone of the clutch chamber.

7. An air cooled transmission comprising oil bathed gearing, a clutch connected to the gearing, the gearing and clutch being enclosed in a pair of chambers, respectively, a common cover plate for the chambers having heat conducting fins extending into the gearing chamber for contact with the oil and an external passage having an air inlet, an outlet communicating with the clutch chamber, and fins in heat conducting relation to the first named fins and exposed to air flowing through the passage, fan elements carried by the clutch for inducing a flow of air through the passage into the clutch chamber, the clutch chamber including an exhaust opening for discharging the heated air, and a baffle adjacent the outlet for directing the incoming air towards the low pressure zone of the clutch chamber.

8. An air cooled transmission comprising oil bathed gearing, a clutch connected to the gearing, the gearing and clutch being enclosed in separate chambers having a common heat conducting wall and the clutch chamber having an air inlet and outlet, and exposed operating devices for and rotatable with the clutch, the devices having sufficient surface to act as a fan and establish a flow of air across the wall.

9. An air cooled transmission comprising oil bathed gearing, a clutch connected to the gearing, the gearing and clutch being enclosed in a pair of chambers, respectively, duct means having an air inlet and an outlet communicating with the clutch chamber and operably related to a heat conducting portion of the gearing chamber whose opposite surface is contacted by the oil, and exposed operating devices for and rotatable with the clutch, the devices having sufficient surface to act as a fan and induce a flow of air through the duct means into the clutch chamber, the clutch chamber including an exhaust opening for discharging the heated air.

10. An air cooled transmission comprising oil bathed gearing, a clutch connected to the gearing, the gearing and clutch being enclosed in a pair of chambers, respectively, a common cover plate for the chambers having heat conducting fins extending into the gearing chamber for contact with the oil and an external passage having an air inlet, an outlet communicating with the clutch chamber, and fins in heat conducting relation to the first named fins and exposed to air flowing through the passage, and exposed operating devices for and rotatable with the clutch, the devices having sufficient surface to act as a fan and induce a flow of air through the passage into the clutch chamber, the clutch chamber including an exhaust opening for discharging the heated air.

11. A cover plate for an air cooled transmission having two compartments, one enclosing oil bathed gearing and the other clutch mechanism arranged to act as an air fan, comprising heat conducting fins extending into the gearing compartment for contact with the oil and an external passage having an air inlet, an outlet communicating with the clutch compartment, fins in heat conducting relation to the first named fins and exposed to air induced through the passage by the clutch mechanism, and an exhaust outlet through which the heated air is discharged.

12. A cover plate for an air cooled transmission having two compartments, one enclosing oil bathed gearing and the other clutch mechanism arranged to act as an air fan, comprising heat conducting fins extending into the gearing compartment for contact with the oil and an external passage having an air inlet, an outlet communicating with the clutch compartment, fins in heat conducting relation to the first named fins and exposed to air induced through the passage by the clutch mechanism, a baffle adjacent the outlet for directing the air inwardly of the clutch compartment, and an exhaust opening through which the heated air is discharged.

13. In an air cooled transmission having two compartments separated by a heat conducting wall, one enclosing oil bathed gearing and the other clutch mechanism arranged to act as an air fan, a cover plate for the clutch compartment having openings for admitting and exhausting a flow of air established by the clutch mechanism across the wall.

14. In an air cooled transmission having two compartments separated by a heat conducting wall, one enclosing oil bathed gearing and the other clutch mechanism arranged to act as an air fan, a cover plate for the clutch compartment having openings for admitting and exhausting a flow of air established by the clutch mechanism across the wall, and, a baffle adjacent the inlet for directing the air inwardly of the clutch compartment.

15. Means for air cooling a transmission having a compartment enclosing oil bathed gearing comprising a cover plate for the compartment having an air duct external of the compartment through which air is flowed, heat conducting fins in the duct extending lengthwise of the air flow, and heat conducting fins extending into the compartment for contact with the oil therein and being positioned so that oil thrown by the gearing flows along the fins, the two sets of fins being in heat exchanging relation and angularly disposed.

16. Means for air cooling a transmission having a compartment enclosing oil bathed gearing comprising a heat conducting, cover plate for the compartment having an air duct external of the compartment through which air is flowed, a plurality of heat conducting channels secured to the compartment side of the plate to form a plurality of fins for contact with the oil in the compartment, and a plurality of heat conducting channels secured to the duct side of the plate to form a plurality of fins for heat exchange with the air.

17. Fabricated means for air cooling a transmission having a compartment enclosing oil bathed gearing comprising a heat conducting, cover plate for the compartment, a cover clamping the plate in position and forming an air duct with the plate, a plurality of heat conducting fins extending from the plate into the compartment for contact with the oil therein, and a plurality of heat conducting fins extending from the plate into the duct.

18. An air cooled transmission comprising oil bathed gearing, a clutch connected to the gearing, the gearing and clutch being enclosed in separate chambers with the gearing chamber having a heat conducting wall and the clutch chamber having a portion formed as a duct communicating with the atmosphere and operably related to the wall, and fan elements on the clutch for establishing a flow of air through the duct and across the wall.

19. An air cooled transmission comprising oil bathed gearing, a clutch connected to the gearing, the gearing and clutch being enclosed in separate chambers with the gearing chamber having a heat conducting wall, duct means communicating with the atmosphere and the clutch chamber and operably related to the wall, and fan elements on the clutch for establishing a flow of air through the duct means and across the wall.

20. An air cooled transmission comprising oil bathed gearing, a clutch connected to the gearing, the gearing and clutch being enclosed in a pair of chambers, respectively, a wall of the gearing chamber having heat conducting fins extending inwardly thereof for contact with the oil and the clutch chamber having a portion formed as a duct communicating with the atmosphere and having fins in heat conducting relation to the wall fins and exposed to air flowing through the duct, and fan elements on the clutch for establishing a flow of air through the duct and across the wall.

21. An air cooled transmission comprising oil bathed gearing, a clutch connected to the gearing, the gearing and clutch being enclosed in separate chambers with the gearing chamber having a heat conducting wall, duct means communicating with the atmosphere and the clutch chamber and operably related to the wall, fan elements on the clutch for establishing a flow of air through the duct means and across the wall, and a baffle for directing air flowing into the clutch chamber toward the low pressure zone thereof.

22. An air cooled transmission comprising oil bathed gearing, a clutch connected to the gearing, the gearing and clutch being enclosed in separate chambers with the gearing chamber having a heat conducting wall, duct means communicating with the atmosphere and the clutch chamber and operably related to the wall, and exposed operating devices for and rotatable with the clutch, the devices having sufficient surface to act as a fan and establish a flow of air through the duct means and across the wall.

23. An air cooled transmission comprising oil bathed gearing, a clutch connected to the gearing, the gearing and clutch being enclosed in separate chambers with the gearing chamber having a heat conducting wall and the clutch chamber having a portion formed as a duct communicating with the atmosphere and operably related to the wall, and exposed operating devices for and rotatable with the clutch, the devices having sufficient surface to act as a fan and establish a flow of air through the duct means and across the wall.

24. A cover plate for an air cooled transmission having two compartments, one enclosing oil bathed gearing and the other clutch mechanism arranged to act as an air fan, comprising heat conducting fins extending into the gearing compartment for contact with the oil and an external passage communicating with the atmosphere and the clutch compartment and having fins in heat conducting relation to the first named fins, the passage fins being disposed in an air flow established by the clutch mechanism.

25. A cover plate for an air cooled transmission having two compartments, one enclosing oil bathed gearing and the other clutch mechanism arranged to act as an air fan, comprising heat conducting fins extending into the gearing compartment for contact with the oil and an external passage having openings communicating with the atmosphere and other openings communicating with the clutch compartment and having fins in heat conducting relation to the first named fins, the passage fins being disposed in an air flow established by the clutch mechanism, and a baffle for directing the air inwardly of the clutch compartment.

26. Means for air cooling a transmission having a compartment enclosing oil bathed gearing comprising a heat conducting, cover plate for the compartment having an air duct external of the compartment through which air is flowed, a plurality of heat conducting channels secured to the compartment side of the plate to form a plurality of fins for contact with the oil in the compartment, and a plurality of heat conducting channels secured to the duct side of the plate to form a plurality of fins for heat exchange with the air, the two sets of fins being angularly disposed and the compartment fins being positioned so that oil thrown by the gearing flows along the fins.

27. Fabricated means for air cooling a transmission having a compartment enclosing oil bathed gearing comprising a heat conducting, cover plate for the compartment, a cover clamping the plate in position and forming an air duct with the plate, a plurality of heat conducting fins extending from the plate into the compartment for contact with the oil therein, and a plurality of heat conducting fins extending from the plate into the duct, the two sets of fins being angularly disposed and the compartment fins being positioned so that oil thrown by the gearing flows along the fins.

NICHOLAS F. ADAMSON.